(12) United States Patent
Fan (10) Patent No.: US 6,305,960 B1
(45) Date of Patent: Oct. 23, 2001

(54) SIM CARD CONNECTOR WITH IMPROVED DETECTING SWITCH

(75) Inventor: Chia Hao Fan, Shu-Lin (TW)

(73) Assignee: Hon Hai Precision Ind. Co., Ltd., Taipei Hsien (TW)

(*) Notice: Subject to any disclaimer, the term of this patent is extended or adjusted under 35 U.S.C. 154(b) by 0 days.

(21) Appl. No.: 09/752,405

(22) Filed: Dec. 27, 2000

(30) Foreign Application Priority Data

Dec. 20, 2000 (TW) ................................................ 89222122

(51) Int. Cl.[7] ................................................ H01R 29/00
(52) U.S. Cl. ........................ 439/188; 439/862; 439/630
(58) Field of Search ........................... 439/188, 630, 439/260, 862, 60, 267

(56) References Cited

U.S. PATENT DOCUMENTS 6,053,776 * 4/2000 Bricaud et al. ...................... 439/630

FOREIGN PATENT DOCUMENTS

2210717-A * 6/1989 (GB) ...................................... 439/188

* cited by examiner

Primary Examiner—Tho D. Ta
(74) Attorney, Agent, or Firm—Wei Te Chung (57) ABSTRACT

A subscriber identity module (SIM) card connector (1) includes an insulating base (10), a plurality of contact elements (20) partially received in the base, and a one-piece switch member (30) partially received in a channel (13) defined in a top surface (12) of the base. The switch member has upper and lower contact branches (34, 35) extendingrearwardly beyond a rear face of the base. The upper contact branch has an upper contact portion (340) projecting upwardly beyond the top surface of the base. The lower contact branches have lower contact portions (350) projecting downwardly in proximity to a printed circuit board (PCB).

7 Claims, 8 Drawing Sheets

SIM CARD CONNECTOR WITH IMPROVED DETECTING SWITCH

FIELD OF THE INVENTION

The present invention generally relates to a subscriber identity module (SIM) card connector, and more particularly, to a SIM card connector with an improved switch member for detecting full insertion of a SIM card.

BACKGROUND OF THE INVENTION

Subscriber identity module (SIM) cards are widely used with electrical devices, such as personal computers, notebooks, portable phones, PDAs and the like. SIM card connectors are adapted to connect SIM cards with the electrical devices. A SIM card connector usually needs a switch device for detecting full insertion of the SIM card.

U.S. Pat. No. 6,086,426 discloses a card connector with a switching device. The switching device includes an upper and a lower switching member. The upper and lower switching members respectively have an upper contact portion and a lower contact portion. The upper switching member further has a biasing hump for engaging with a leading edge of a card. The upper and lower switching members are assembled to the base in juxtaposition, and the upper contact portion is located above the lower contact portion. A stopper of the upper switching member limits movement of the upper contact portion. The contact portions are spaced apart from each other before the card is inserted. The biasing hump projects into an insertion path of the card. When the card is inserted into the connector and reaches its final position, the leading edge of the card slides over the biasing hump of the upper switching member, thereby pushing the upper contact portion to engage with the lower contact portion to establish an electrical connection therebetween.

However, the switch device needs two switch members, thus requiring a complicated manufacturing process and a high cost.

U.S. Pat, No. 6,130,387 discloses a switch assembly built into a connector that connects to pads of a smart card. The connector includes a frame extension or support for the switch assembly. The switch assembly has a switch element. The switch element includes a contacting part extending forwardly and downwardly in proximity to a printed circuit board, and a pedal extending laterally and upwardly from a side of the contacting part, through a hole in the frame extension or support. When the smart card is inserted into the connector, the pedal is depressed, causing the contacting part to be depressed against a circuit trace of the printed circuit board. This results in the closing of the switch.

However, the pedal and the contacting part are non-symmetrically formed on the switch element, which may affect the resiliency and cause a misconnection of the contacting part with the circuit trace of the printed circuit board after a period of use.

BRIEF SUMMARY OF THE INVENTION

A main object of the invention is to provide a subscriber identity module (SIM) card connector with a sensitive switch member for detecting full insertion of a SIM card.

Another object of the invention is to provide a SIM card connector with a one-piece switch member which is easily manufactured and which has a low profile.

A SIM card connector in accordance with the present invention includes an insulating base defining a plurality of recesses in a top surface thereof and a channel in the top surface and juxtaposed with the recesses, a plurality of contact elements received in the recesses, and a switch member partially retained in the channel. A block projects upwardly from a bottom of the channel. The switch member defines a longitudinal center line and has a solder tail at a front end thereof, a mounting portion to a rear of the solder tail, a switch contact at a rear end thereof and a cantilever beam between the mounting portion and the switch contact. The switch contact extends rearwardly beyond a rear face of the base and has an upper contact portion projecting upwardly beyond the top surface of the base for electrically connecting with a SIM card, and lower contact portions projecting downwardly in proximity to a printed circuit board (PCB). The upper and lower contact portions are symmetric about a vertical plane containing the center line. When fully inserted into the SIM card connector, the SIM card depresses the upper contact portion, causing the lower contact portions to establish electrical connection with a switch trace on the PCB, signaling full insertion of the card in the connector.

The novel features of the invention are set forth with particularity in the appended claims. The invention will be best understood from the following description when read in conjunction with the accompanying drawings.

DETAILED DESCRIPTION OF THE INVENTION

For facilitating understanding, like components are designated by like reference numerals throughout the various embodiments of the invention as shown in the attached drawings.

Referring to FIGS. 1 through 6, in a preferred embodiment, a SIM card connector 1 according to the present invention includes an insulating base 10, a plurality of contact elements 20, and a one-piece switch member 30. The insulating base 10 has a planar top surface 12 for supporting a SIM card 2. A plurality of recesses 11 are defined in the top surface 12 and communicate with either a front or a rear surface of the base 10 for receiving the contact elements 20 therein. A channel 13 is defined in the top surface 12 extending from the front to the rear surface of the base 10 for retaining the switch member 30. A block 14 projects upwardly from a bottom (not labelled) of the channel 13 for supporting the switch member 30. Two slots 15 are respectively defined in opposing interior side walls (not labelled) of the channel 13 and in communication with the channel 13.

Figure 1:
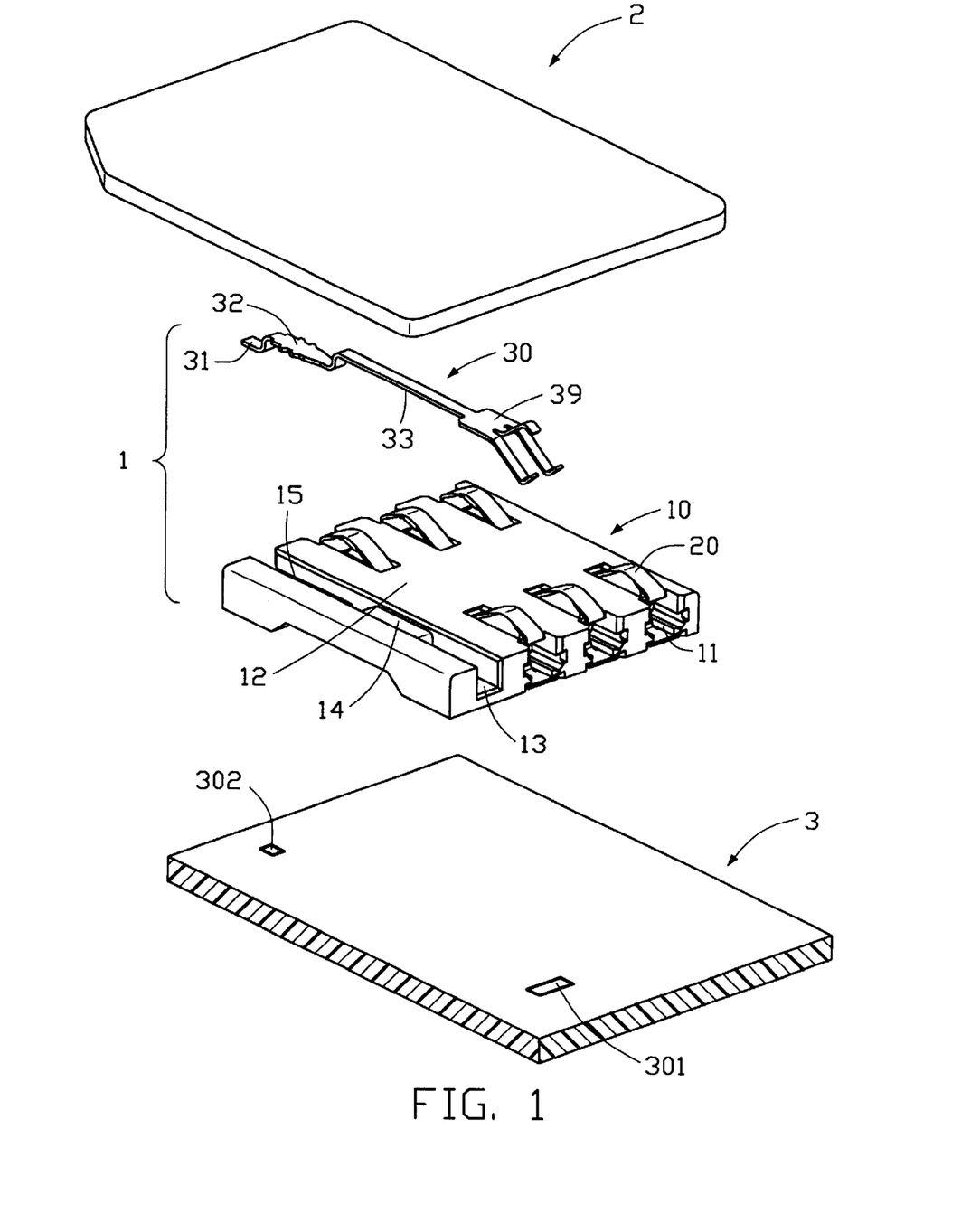
FIG. 1 is an exploded view of a subscriber identity module (SIM) card connector according to an embodiment of the present invention, together with a printed circuit board (PCB) and a SIM card.

Since the structure of the contact elements 20 of the SIM card connector 1 is well known to those skilled in the art, a detailed description thereof is omitted herein.

Figure 2:
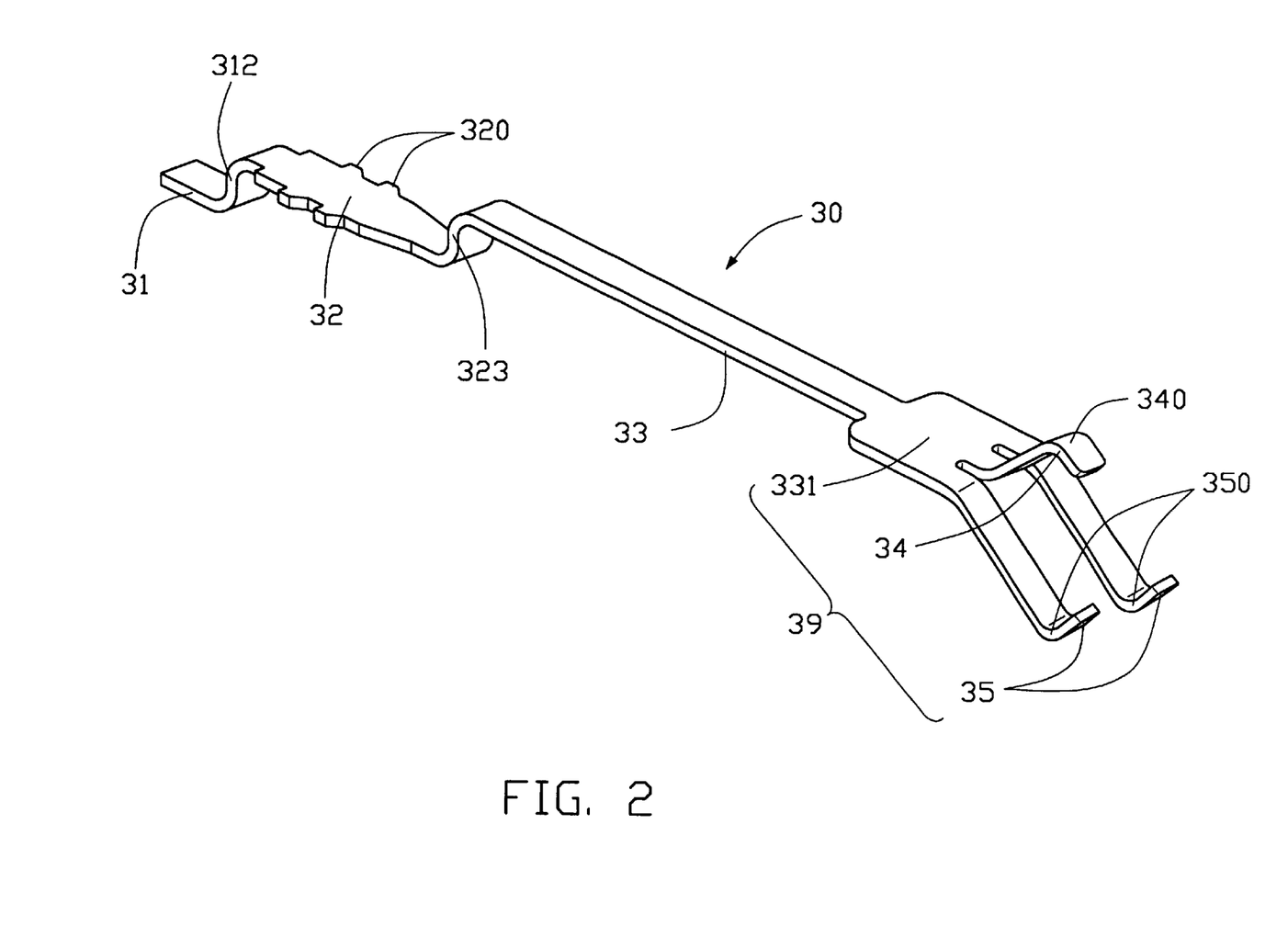
FIG. 2 is a perspective view of a switch member of the SIM card connector of FIG. 1.
Figure 3:
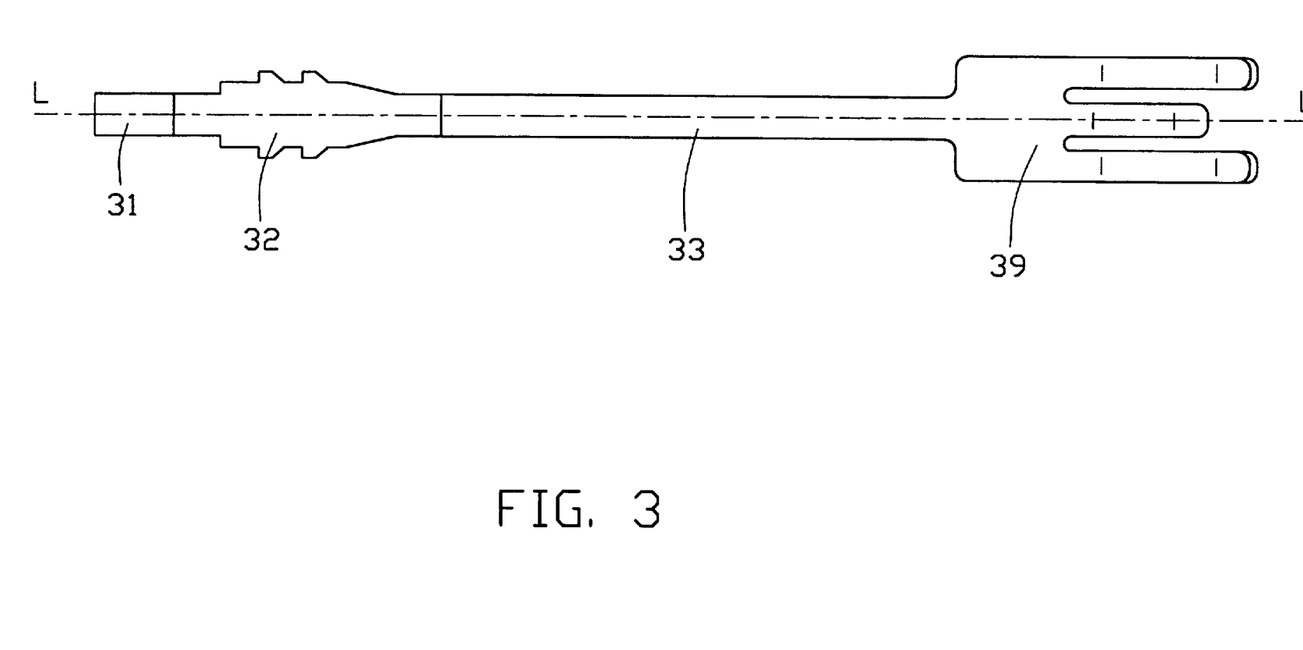
FIG. 3 is a top view of FIG. 2.

Particularly referring to FIGS. 2 and 3, the switch member 30 defines a longitudinal center line L—L and includes a solder tail 31 at a front end thereof adapted for soldering to a PCB 3, a planar mounting portion 32 to a rear of the solder tail 31, a switch contact 39 at a rear end thereof, and a horizontal cantilever beam 33 between the mounting portion 32 and the switch contact 39. The mounting portion 32 is located between the cantilever beam 33 and the solder tail 31 in both a horizontal direction and in a vertical direction. A first connecting portion 312 is formed between the mounting portion 32 and the solder tail 31. A second connecting portion 323 is formed between the mounting portion 32 and the cantilever beam 33. Two pairs of barbs 320 respectively protrude from opposite sides of the mounting portion 32.

The switch contact 39 includes a planar portion 331 attached to a rearward end of the cantilever beam 33, which is wider than the cantilever beam 33. A pair of lower contact branches 35 downwardly and rearwardly extend from a rearward end of the planar portion 331, and an upper contact branch 34 upwardly and rearwardly extends from the rearward end of the planar portion 331 and between the lower contact branches 35. The switch contact 39 extends beyond the rear face of the base 10. The upper contact branch 34 projects beyond the top surface 12 of the base 10. The upper contact branch 34 has an upper contact portion 340 projecting upwardly, and each of the lower contact branches 35 has a lower contact portion 350 projecting downwardly. The upper and lower contact portions 340, 350 are respectively symmetric about a vertical plane containing the center line L—L.

Figure 4:
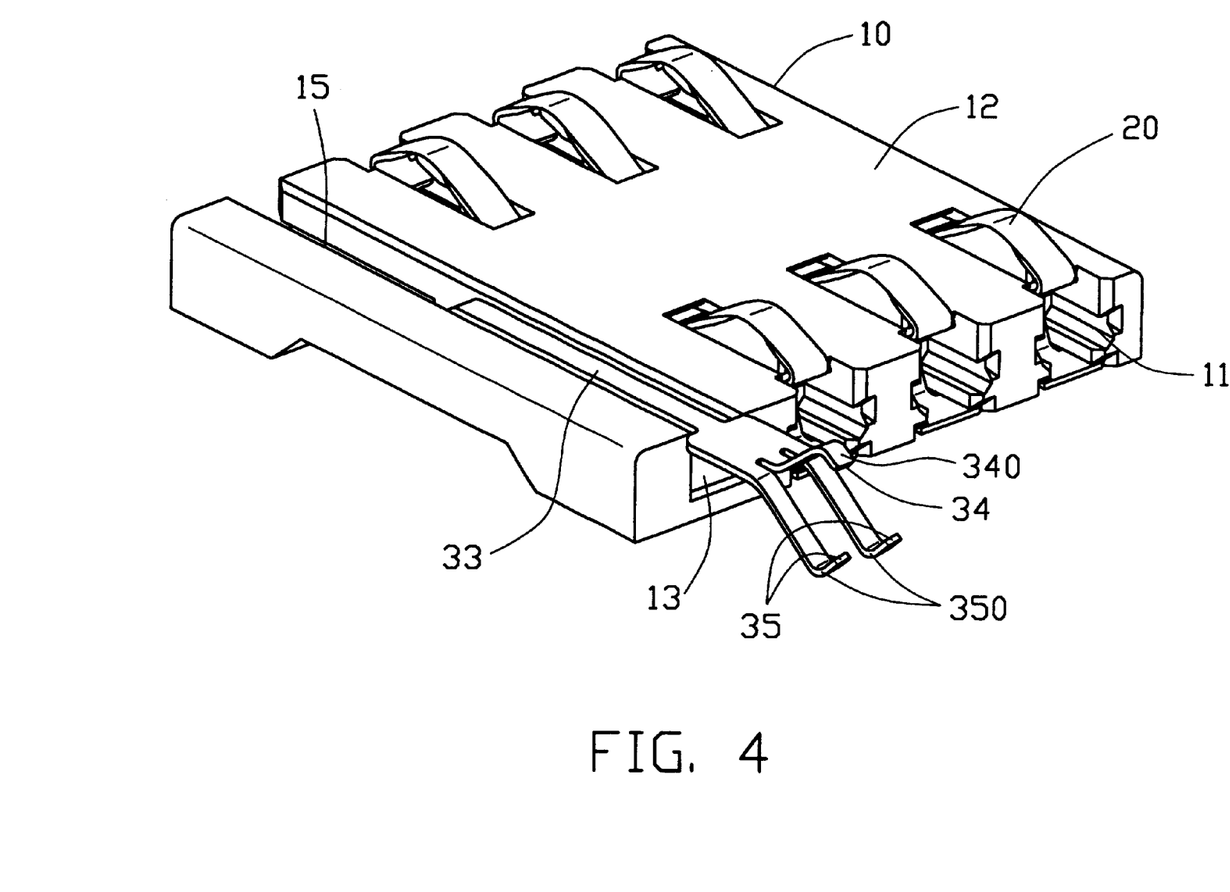
FIG. 4 is an assembled view of the SIM card connector of FIG. 1.

Particularly referring to FIG. 4, in assembly, each contact element 20 is partially received in a corresponding recess 11 and partially exposed to the top surface 12. The switch member 30 is partially retained in the channel 13 of the base 10 with the switch contact 39 projecting beyond the rear face of the base 10. A front end of the cantilever beam 33 is supported by the block 14, with a rear surface of the second connecting portion 323 abutting a front face of the block 14. A rear portion of the cantilever beam 33 is spaced from the bottom of the channel 13, such that a slight pressure acted on the upper contact branch 34 easily leads to a depression of the lower contact branches 35, thereby forming an electrical connection between the lower contact branches 35 and a switch trace 301 of the PCB 3. The mounting portion 32 is retained in the channel 13 with the barbs 320 engaging with the slots 15. A rear surface of the first connecting portion 312 abuts against a front surface of the base 10 and the solder tail 31 is soldered to a solder trace 302 of the PCB 3.

Figure 5:
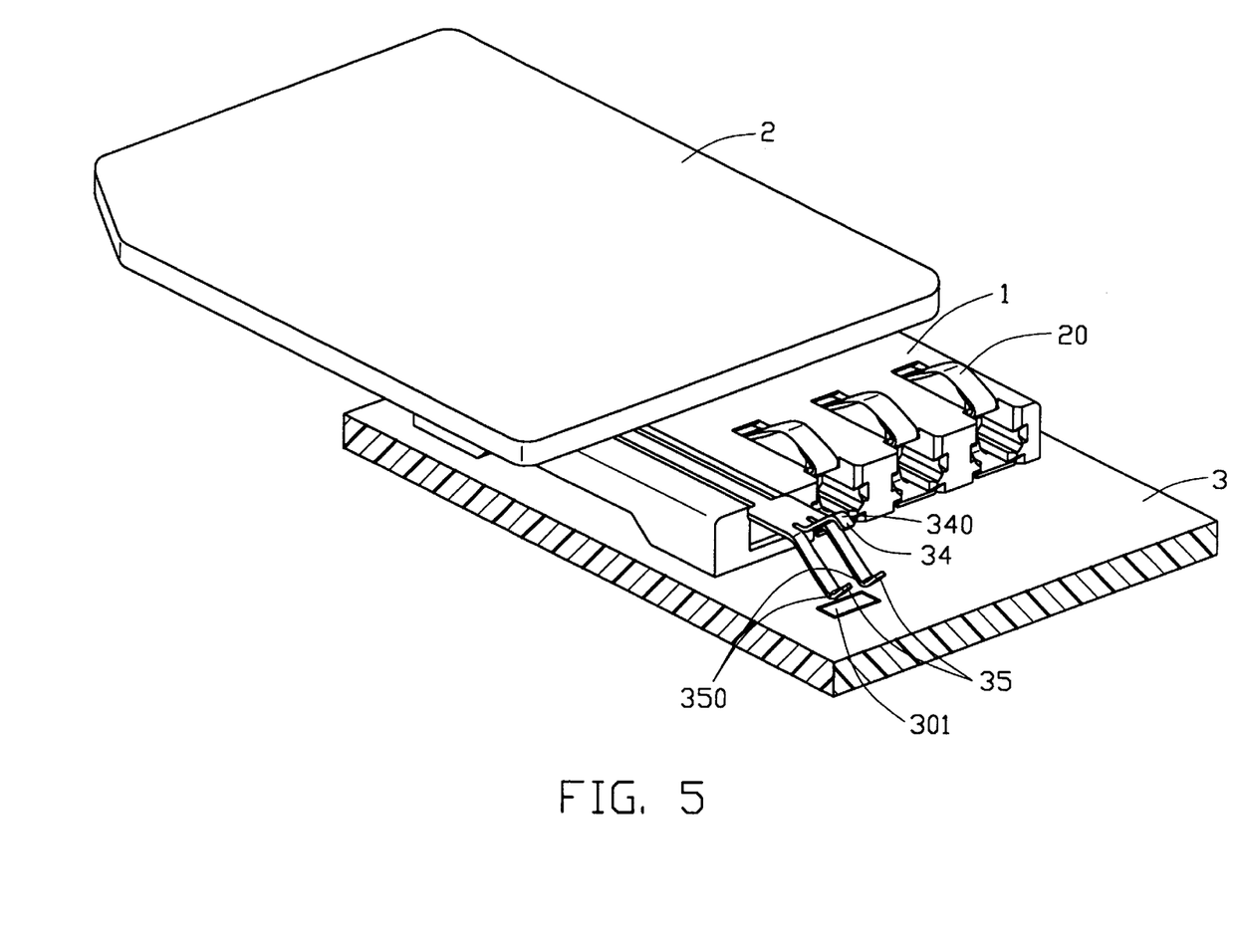
FIG. 5 is an assembled view of FIG. 1 with the SIM card sliding over the SIM card connector.
Figure 6:
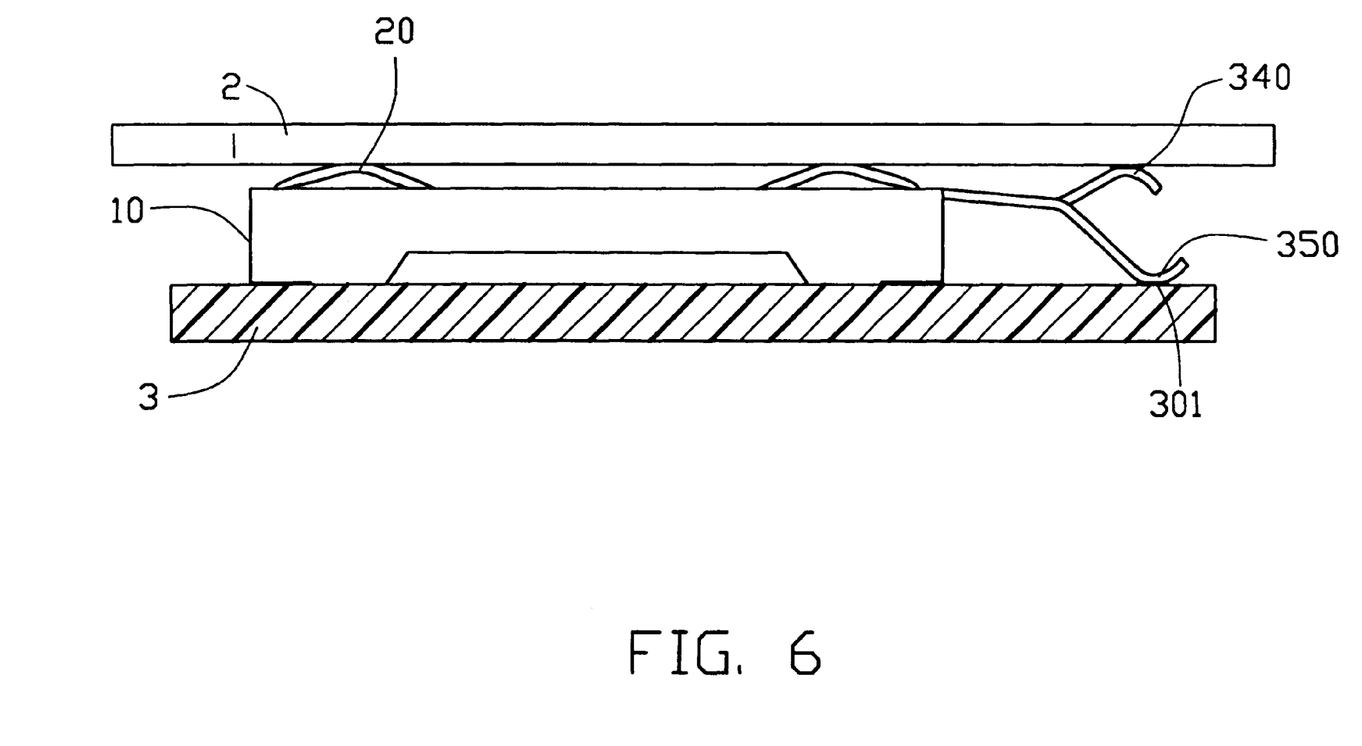
FIG. 6 is a side view of the SIM card connector mounted on the PCB with the SIM card thereon.

Particularly referring to FIGS. 5 and 6, when a SIM card 2 is inserted into the connector 1, the contact portions (not labeled) of the contact elements 20 and the upper contact portion 340 of the switch member 30 are depressed and electrically connect with the contact pads (not shown) of the SIM card 2. The downward movement of the upper contact portion 340 depresses the lower contact branches 35 and the lower contact portions 350 of the lower contact branches 35 contact the switch trace 301 of the PCB 3, establishing an electrical connection therewith. The closing of this electrical connection signals full insertion of the SIM card 2. Because the switch contact 39 is symmetric about the vertical plane through the center line L—L, forces within the switch contact 39 are evenly distributed, when the upper contact portion 340 is depressed, contributing to a longer useful life of the switch member 30.

Figure 7:
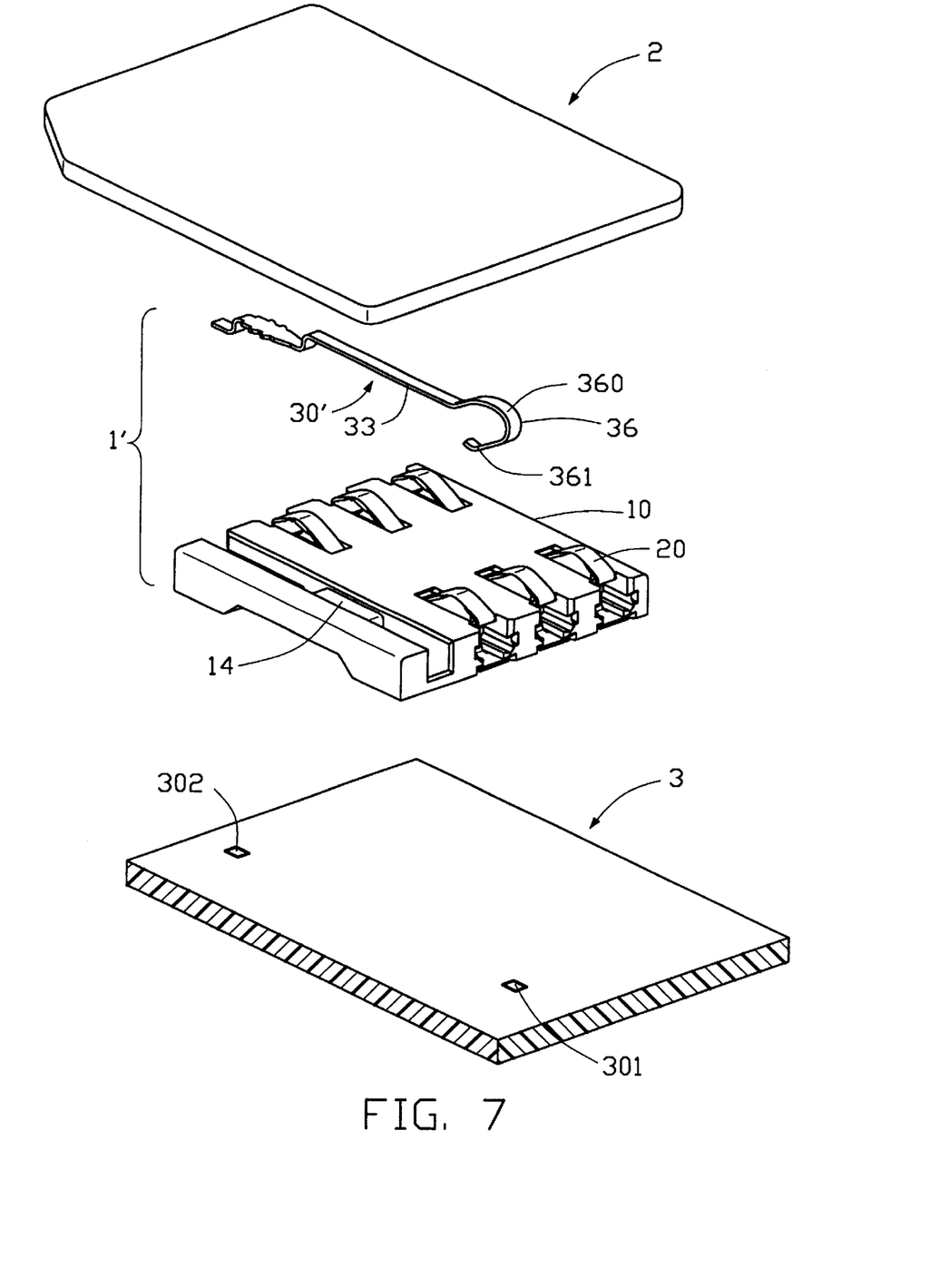
FIG. 7 is an exploded view of a SIM card connector according to another embodiment of the present invention together withal PCB and a SIM card.
Figure 8:
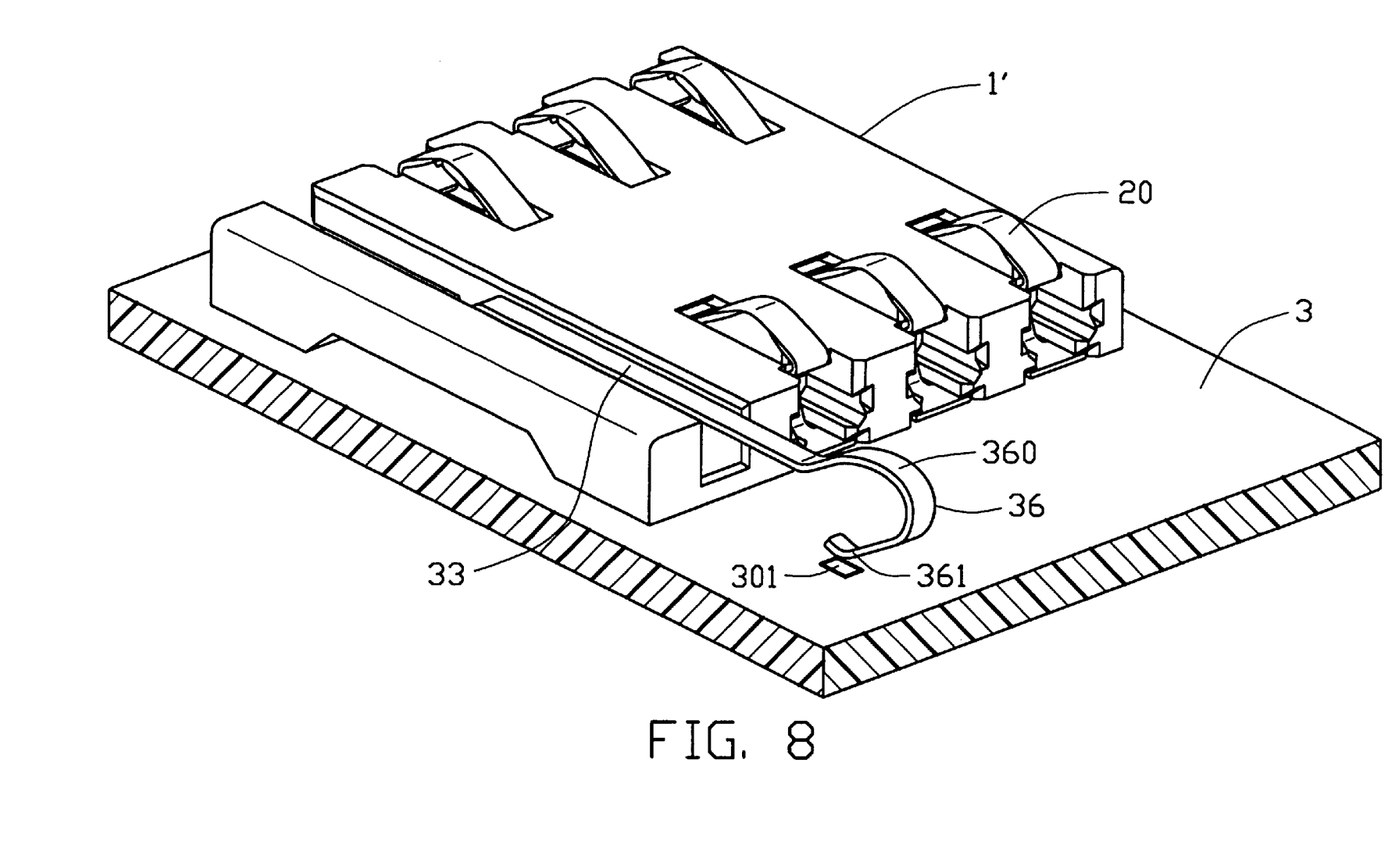
FIG. 8 is an assembled view of the SIM card connector of FIG. 7 mounted on the PCB.

FIGS. 7 and 8 show another embodiment of the invention. The SIM card connector 1' is similar to the earlier-described connector 1 except that the switch member 30' of the SIM card connector 1' has a hook-shaped switch contact 36 with upper and lower contact portions 360, 361 instead of the planar portion 331 and the upper and lower contact branches 34, 35 of the previous embodiment. The upper and the lower contact portions 360, 361 are vertically aligned and respectively symmetric about a vertical plane passing through a longitudinal center line. When a card 2 is inserted into the SIM card connector 1', it depresses the upper contact portion 360, causing the lower contact portion 361 to contact the PCB 3 and to engage with the switch trace 301 of the PCB 3 to establish an electrical connection therebetween. The establishment of this connection signals full insertion of the SIM card 2 into the SIM card connector 1'. The switch contact 36 has a longer useful life since upper and lower contact portions 360, 361 are symmetric about a vertical plane passing through a longitudinal center line of the switch member 30', leading to evenly distributed forces in the switch contact 36 when it is subject to pressure by the inserted card 2.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A card connector for connecting a card with a printed circuit board (PCB), comprising:
    a rectangular insulating base defining a channel in a top surface thereof;
    a plurality of contact elements received in the base; and
    a one-piece switch member having a mounting portion retained in said channel, a solder tail adapted for being soldered to the PCB, a switch contact projecting beyond a rear face of the base, and a horizontal cantilever beam between the mounting portion and the switch contact, the switch contact defining a longitudinal center line and including upper and lower contact portions respectively symmetric about a vertical plane containing the center line, the upper contact portion, upon full insertion of a card, being depressed to move the lower contact portion toward the PCB; and
    wherein the lower contact portion has a pair of lower contact branches, and the upper contact portion has an upper contact branch between the lower contact branches.

2. The card connector according to claim 1, wherein the switch contact further includes a planar portion from which the upper and lower contact branches originate, the planar portion being wider than the cantilever beam.

3. The card connector according to claim 1, wherein a block projects upwardly from a bottom of the channel, and wherein a front portion of the cantilever beam is supported by the block and a rear portion of the cantilever beam is spaced from a bottom of the channel.

4. The card connector according to claim 1, wherein two slots are defined in opposing side walls of the channel, and wherein the mounting portion forms barbs on opposite sides thereof for respectively engaging with the slots.

5. A card connector assembly comprising:
a printed circuit board including a solder trace and a switch trace thereon;
a card connector mounted on the printed circuit board, said connector including an insulative housing with a plurality of contact elements therein and with a top surface thereon;
a one-piece switch member positioned in the housing, said switch member soldered on said solder trace and including a resilient beam with upper and lower contact portions around an end thereof;
a card adapted to be mounted on said top surface; wherein when no card is positioned upon the top surface, the upper contact portion projects above the top surface and the lower contact portion projects over the switch trace, while when the card is positioned on the top surface, the upper contact portion is pressed downwardly by the card, and the lower contact portion is associatively moved downwardly to abut against the switch trace with mechanical and electrical connections therebetween and
wherein the lower contact portion has a pair of lower contact branches, and the upper contact portion has an upper contact branch between the lower contact branches.

6. The assembly according to claim 5, wherein said beam is of the cantilever type.

7. A card connector comprising:
an insulative housing with a plurality of contacts therein and with opposite top and bottom faces thereon, said contacts extending upwardly above the top face and also downwardly to reach the bottom face;
a one-piece switch member positioned in the housing with a solder portion at one end, said switch member further including a resilient beam with upper and lower contact portions around a distal end thereof; wherein said upper contact portion upwardly extends above the top face, and the lower contact portion extends above the bottom face while is adapted to extend downwardly beyond the bottom face when the upper contact portion is downwardly pressed by a card which is installed on the top face of the housing; and
wherein the lower contact portion has a pair of lower contact branches, and the upper contact portion has an upper contact branch between the lower contact branches.

* * * * *